(12) United States Patent
Deschambault et al.

(10) Patent No.: US 10,437,659 B2
(45) Date of Patent: Oct. 8, 2019

(54) BUILT-IN CONTEXT ERROR VARIABLES

(71) Applicant: Silicon Laboratories Inc., Austin, TX (US)

(72) Inventors: Olivier Deschambault, Verdun (CA); Alexandre Autotte, Longueuil (St-Hubert) (CA); Jean-Francois Deschenes, Ste-Marthe-sur-le-lac (CA); Cedric Migliorini, Roxboro (CA); Marylise Monchalin, Montreal (CA)

(73) Assignee: Silicon Laboratories, Inc., Austin, TX (US)

( * ) Notice: Subject to any disclaimer, the term of this patent is extended or adjusted under 35 U.S.C. 154(b) by 0 days.

(21) Appl. No.: 15/449,022

(22) Filed: Mar. 3, 2017

(65) Prior Publication Data

US 2018/0253348 A1  Sep. 6, 2018

(51) Int. Cl.
G06F 9/44         (2018.01)
G06F 11/07        (2006.01)

(52) U.S. Cl.
CPC ...... *G06F 11/0775* (2013.01); *G06F 11/0769* (2013.01)

(58) Field of Classification Search
CPC .................................................. G06F 11/0775
USPC ...................................................... 717/124
See application file for complete search history.

(56) References Cited

U.S. PATENT DOCUMENTS

| | | | | |
|---|---|---|---|---|
| 5,212,693 A * | 5/1993 | Chao | ......... | G06F 8/66 712/E9.015 |
| 5,809,543 A * | 9/1998 | Byers | ......... | G06F 11/1666 711/120 |
| 5,909,580 A * | 6/1999 | Crelier | ......... | G06F 11/366 714/E11.211 |
| 6,237,140 B1 * | 5/2001 | Carter | ......... | G06F 8/78 707/999.006 |
| 7,765,525 B1 * | 7/2010 | Davidson | ......... | G06F 11/3636 717/110 |
| 2005/0081115 A1 * | 4/2005 | Cheng | ......... | G06F 11/0724 714/47.1 |
| 2005/0144526 A1 * | 6/2005 | Banko | ......... | G06F 11/079 714/38.12 |
| 2007/0226708 A1 * | 9/2007 | Varma | ......... | G06F 8/51 717/139 |

(Continued)

OTHER PUBLICATIONS

Title: Design and code inspections to reduce errors in program development, author: M Fagan, published on 2002.*

(Continued)

*Primary Examiner* — Chameli Das
(74) *Attorney, Agent, or Firm* — Nields, Lemack & Frame, LLC

(57) ABSTRACT

A novel method of reporting pertinent information in the event of an error during the execution of a software application is disclosed. The software application includes one or more error reporting structures, which are used to store the pertinent information for each error that is encountered. The pertinent information may include, for example, the file name, the function name, the line number within the function, and others. In some embodiments, a macro is used to populate one or more fields of the error reporting structure. Various methods of identifying the location of the error reporting structure are also disclosed.

13 Claims, 3 Drawing Sheets

(56) References Cited

U.S. PATENT DOCUMENTS

| | | | | |
|---|---|---|---|---|
| 2007/0260919 A1* | 11/2007 | Kerner | ................ | G06F 11/0727 |
| | | | | 714/15 |
| 2010/0325619 A1* | 12/2010 | Song | ...................... | G06F 8/443 |
| | | | | 717/143 |
| 2011/0252268 A1* | 10/2011 | Avizienis | ............ | G06F 11/0793 |
| | | | | 714/2 |
| 2013/0159820 A1* | 6/2013 | Koker | ................... | H03M 13/09 |
| | | | | 714/805 |
| 2014/0143615 A1* | 5/2014 | Ohwada | ................ | G06F 11/32 |
| | | | | 714/57 |
| 2015/0033202 A1* | 1/2015 | Wilson | ...................... | G06F 8/43 |
| | | | | 717/106 |
| 2016/0179612 A1* | 6/2016 | Jokinen | ............... | G06F 11/1004 |
| | | | | 714/807 |
| 2017/0220404 A1* | 8/2017 | Polar Seminario | ..... | G06F 8/654 |
| 2018/0068741 A1* | 3/2018 | Dodson | ................ | G11C 29/44 |

OTHER PUBLICATIONS

Title: Bugs as deviant behavior: A general approach to inferring errors in systems code, author: D Engler et al, ACM published on 2001.*

Ken Getz, "Error Handling in Visual Basic .NET," Feb. 2002, https://msdn.microsoft.com/en-us/library/ms973849.aspx.

Cat Francis, "Introduction to Exception Handling in Visual Basic .NET," Feb. 2002, https://msdn.microsoft.com/en-us/library/aa289505(v=vs.71).aspx.

* cited by examiner

```
#DEFINE RTOS_ERR_SET(ERR_VAR,ERR_CODE)
            (ERR_VAR).CODE      =(ERR_CODE);                        \
            (ERR_VAR).CODE TEXT =RTOS_ERR_STR_GET((ERR_CODE));      \
            (ERR_VAR).DESC TEXT =RTOS_ERR_DESC_STR_GET((ERR_CODE)); \
            (ERR_VAR).FILENAME  =__FILE__;                          \
            (ERR_VAR).LINENBR   =__LINE__;                          \
            (ERR_VAR).FNCTNAME  =&__FUNC__[0]
```

*FIG. 3A*

```
#DEFINE RTOS_ERR_SET(ERR_VAR,ERR_CODE)
            (ERR_VAR).CODE      =(ERR_CODE);        \
            (ERR_VAR).FILENAME  =__FILE__;          \
            (ERR_VAR).LINENBR   =__LINE__;          \
            (ERR_VAR).FNCTNAME  =&__FUNC__[0]
```

*FIG. 3B*

BUILT-IN CONTEXT ERROR VARIABLES

FIELD

This disclosure relates to error reporting for software applications, and most particularly, to more specific reporting of pertinent information.

BACKGROUND

During the creation of software applications, coding errors are not uncommon. Finding these errors, or debugging, can be a tedious process. For example, it may be possible that the same error scenario occurs at various points in the software.

As an example, assume that the software is designed for a network device. One possible error is that a remote node, to which the present device is communicating or attempting to communicate with, stops responding or becomes unavailable. This may occur at various points in the software. For example, this may occur when the present device is transmitting information to that remote node and the remote node fails to acknowledge that information. Alternatively, it may occur when the remote node is transmitting information to the present node and then simply stops. Of course, there are other scenarios when may cause the present device to determine that the remote device is no longer available.

This can happen with other error scenarios as well. For example, the software may be configured to expect a response (such as from a remote node or another software module) within a predetermined period of time. If that response is not received within that period of time, an error is generated. This error may indicate that a time-out occurred. Again, an error reporting a time-out may be associated with various different actions and procedures.

Consequently, the use of simple error codes may make it difficult to efficiently debug the software, since the error code may fail to provide enough information as to where in the software the error actually occurred. As described above, a time-out may occur at various points in the software. Returning an error indicating that a time-out occurred may not pin point the exact location in the software where the error occurred.

Thus, one technique that is used to debug code is to "step" through the code. This involves having the code execute one instruction at a time so that the software developer can observe what is occurring. However, in the case of certain errors, such as the time-out scenario presented above, the error may not occur in this debug mode. Further, even if the error does occur, the time expended to identify where the error occurred may be unacceptably high.

Therefore, it would be beneficial if there were system and method for providing more comprehensive error information whenever the software encountered an error. This comprehensive error information would allow the developer to more quickly identify and rectify the problem.

SUMMARY

A novel method of reporting pertinent information in the event of an error during the execution of a software application is disclosed. The software application includes one or more error reporting structures, which are used to store the pertinent information for each error that is encountered. The pertinent information may include, for example, the file name, the function name, the line number within the function, and others. In some embodiments, a macro is used to populate one or more fields of the error reporting structure. Various methods of identifying the location of the error reporting structure are also disclosed.

According to one embodiment, a method of reporting errors in a software application is disclosed. The method comprises detecting an error has occurred; assigning an error code number to the error; determining a name of a file that was executing when the error occurred; and writing the error code number and the name of the file to an error reporting structure. In certain embodiments, the method further comprises determining a line number where the error occurred and writing the line number in the error reporting structure. In certain embodiments, the method further comprises determining a name of a function which was executing when the error occurred and writing the name of the function in the error reporting structure.

According to another embodiment a method of reporting errors in a software application is disclosed. The method comprises using a main program to define an area in memory to contain an error reporting structure; passing an address of the error reporting structure as a parameter to a function contained within the main program; detecting an error has occurred in the function; and populating the error reporting structure, using the address that was passed to the function. In certain embodiments, a size of the area in memory and fields contained within the error reporting structure are defined based on a compiler flag. In some embodiments, a macro is used to populate the error reporting structure. In certain further embodiments, a size of the area in memory and fields contained within the error reporting structure are defined based on a compiler flag and the compiler flag is also used to define operation of the macro.

According to another embodiment, a non-transitory storage medium is disclosed. The non-transitory storage medium comprises a software application, comprising: a main program to define an area in memory to contain an error reporting structure; and a function contained within the main program to execute an operation; wherein the main program passes an address of the error reporting structure as a parameter to the function; and the function populates the error reporting structure upon detection of an error, using the address that was passed to the function. In some embodiments, the non-transitory storage medium also comprises macro designed to populate the error reporting structure. In certain embodiments, the software application further comprises a compiler flag, wherein a value of the compiler flag determines fields of the error reporting structure. In some embodiments, the compiler flag determines the operation of the macro.

BRIEF DESCRIPTION OF THE DRAWINGS

For a better understanding of the present disclosure, reference is made to the accompanying drawings, which are incorporated herein by reference and in which:

FIG. 3A is a macro designed to populate the fields of the error reporting structure shown in FIG. 2A; and FIG. 3B is a macro designed to populate the fields of the error reporting structure shown in FIG. 2B.

DETAILED DESCRIPTION

The present disclosure describes an enhanced error reporting mechanism, which may be especially beneficial during the development of software applications. This enhanced error reporting mechanism may be used with any device that includes a processing unit and the memory device. In this disclosure, a software application is intended to intend all software programs, and is not limited to any particular embodiment.

Figure 1:
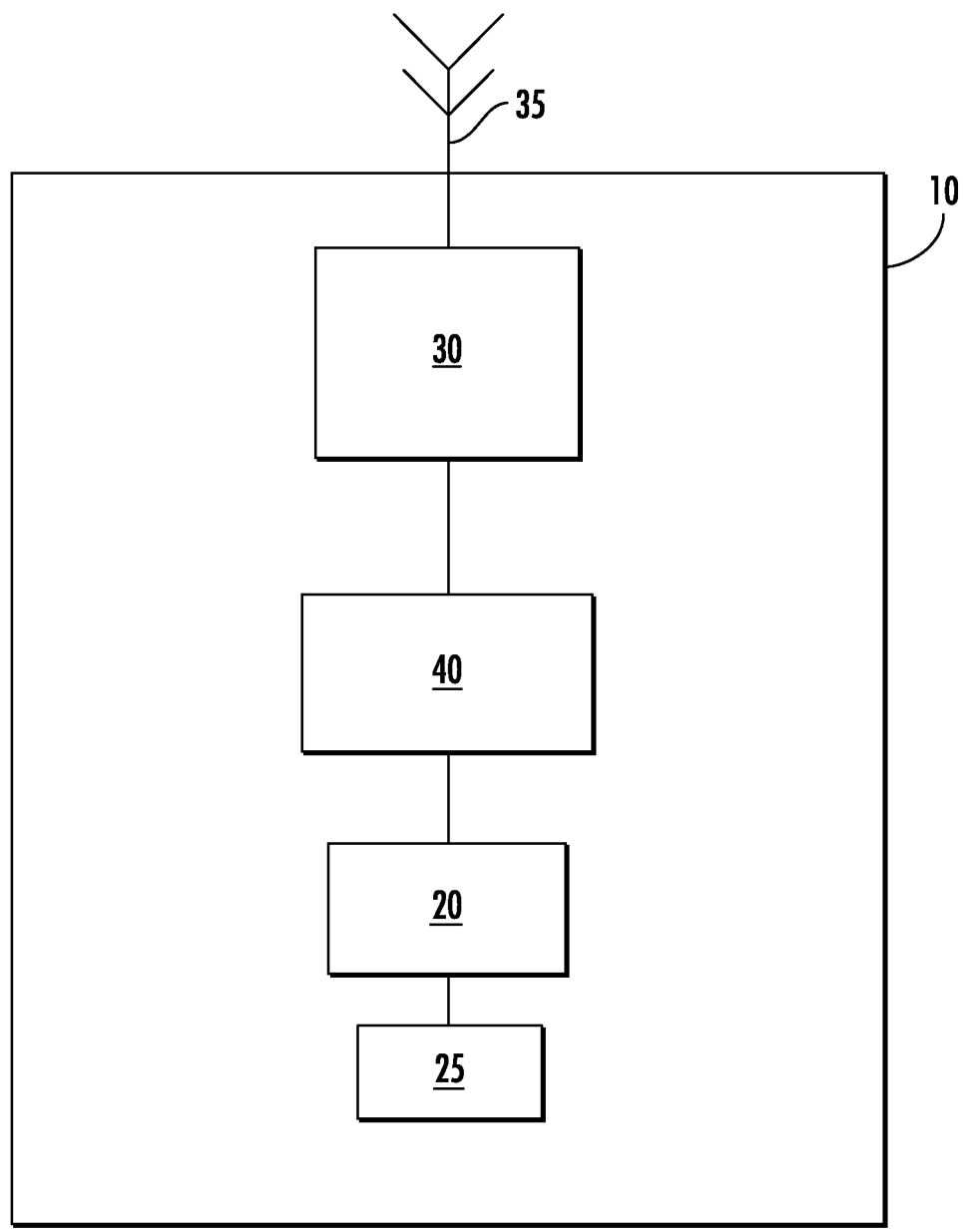
FIG. 1 is a block diagram of a representative device.

For example, FIG. 1 shows a block diagram of a representative device 10, which may utilize the disclosed error reporting mechanism. The device 10 has a processing unit 20 and an associated memory device 25. This memory device 25 contains the instructions, which, when executed by the processing unit 20, enable the device 10 to perform its intended functions. Included within these instructions is the disclosed error reporting mechanism. This memory device 25 may be a non-volatile memory, such as a FLASH ROM, an electrically erasable ROM or other suitable devices. In other embodiments, the memory device 25 may be a volatile memory, such as a RAM or DRAM. In certain embodiments, the memory device 25 may be packaged with the processing unit 20. The processing unit 20 may be any suitable device, including but not limited to a general purpose processor, an application specific processor, an embedded controller, or a personal computer (PC).

In certain embodiments, the device 10 may include a network interface 30, which may be a wireless interface including an antenna 35. The network interface 30 may support any wireless network, including an IEEE802.15.4 network protocol, like ZIGBEE® or Thread, BLUETOOTH®, a cellular protocol, such as 3G, GCM, CDMA, 4G, LTE, or other protocols. In other embodiments, the network interface 30 may be a wired connection, such as USB. In these embodiments, the network interface 30 may not include an antenna 35.

In certain embodiments, the device 10 may also include a second memory device 40 in which data that is received by the network interface 30, and data that is to be transmitted by the network interface 30, is stored. This second memory device 40 is traditionally a volatile memory. The processing unit 20 has the ability to read and write the second memory device 40 so as to communicate with the other nodes in the network. Although not shown, the device also has a power supply, which may be a battery or a connection to a permanent power source, such as a wall outlet.

While a memory device 25 is disclosed, any computer readable medium may be employed to store these instructions. For example, read only memory (ROM), a random access memory (RAM), a magnetic storage device, such as a hard disk drive, or an optical storage device, such as a CD or DVD, may be employed. Furthermore, these instructions may be downloaded into the memory device 25, such as for example, over a network connection (not shown), via CD ROM, or by another mechanism. These instructions may be written in any programming language and the programming language is not limited by this disclosure. Thus, in some embodiments, there may be multiple computer readable media that contain the instructions described herein. The first computer readable media may be in communication with the processing unit 20, as shown in FIG. 1. The second computer readable media may be a CDROM, or a different memory device, which is located remote from the device 10. The instructions contained on this second computer readable media may be downloaded onto the memory device 25 to allow execution of the instructions by the device 10. In certain embodiments, the instructions, before being compiled, are stored on non-transitory storage media.

As described above, error reporting typically comprising reporting an error code, where the error code is associated with an error condition. The error code offers little information regarding the exact location in the software application where the error occurred.

However, the present error reporting mechanism addresses these deficiencies through a novel use of memory to store error information. Specifically, any function that wishes to have the ability to report an error has a pointer to an error reporting structure as a parameter. This pointer represents an address in memory where that function can write information associated with an error that occurred.

Figure 2A:
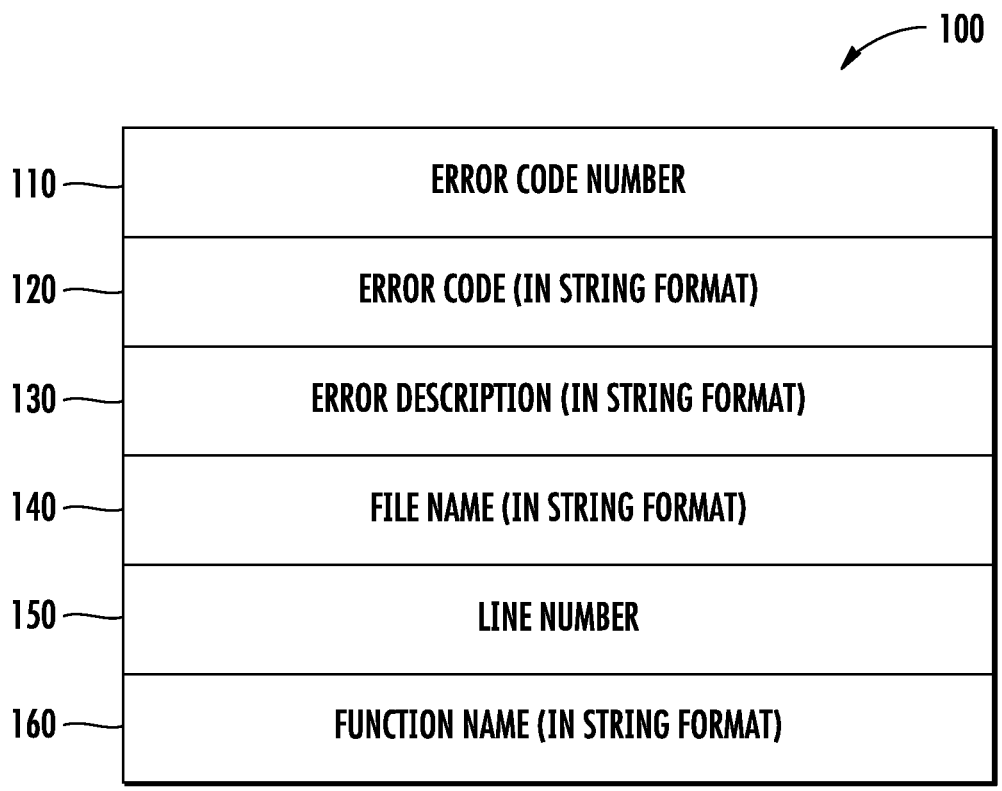
FIG. 2A is an illustration of the error reporting structure according to one embodiment.

In operation, the application simply declares one or more error reporting structures. This action allocates the memory for the one or more error reporting structures. In certain embodiments, the main program (or application) has a single declare statement to allocate memory for one error reporting structure. Of course, the main program (or application) can declare an arbitrary number of error reporting structures, and the disclosure is not limited to just one error reporting structure. When the main program calls a function, it passes to that function a pointer to one of the error reporting structures as a parameter. In operation, the function executes as it normally would. If an error condition arises, the function then fills in the error reporting structure referenced to by the pointer. FIG. 2A shows a representative illustration of an error reporting structure 100 according to one embodiment. In this embodiment, the error reporting structure 100 comprises an error code number 110, the error code 120 as a string, an error description 130 as a string, the file name 140 as a string, the line number 150 and the function name 160 as a string.

Figure 2B:
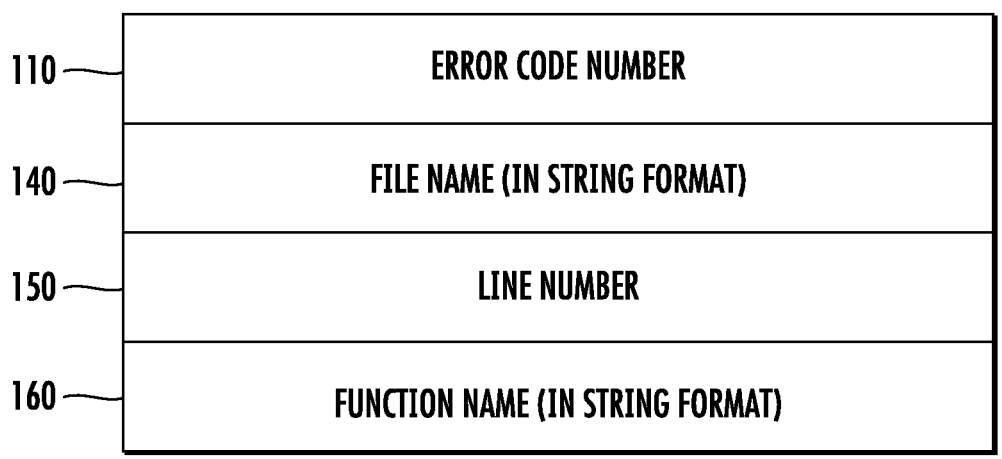
FIG. 2B is an illustration of the error reporting structure according to another embodiment.

However, the size and content of the error reporting structure may vary. For example, in certain embodiments, the error code 120 and error description 130 may not be present. An example of this error reporting structure 200 is shown in FIG. 2B.

In certain embodiments, the function name 160 may not be included. In scenarios where all of these fields are not used, the size of the error reporting structure 100 may be reduced accordingly. In other embodiments, additional fields may be added to the error reporting structure 100.

Upon occurrence of an error, the function may fill in any relevant information, such as error code number 110, the error code 120, the error description 130 erroring text form, the file name 140, the function name 160 that was executing when the error occurred, the line number 150 where the error occurred, and any other pertinent information. The function is able to fill in the error reporting structure because the address of the error reporting structure was passed to the function as one of its parameters. After filling in the error reporting structure, the function may then resume normal operation or simply fail.

In certain embodiments, a macro is defined which is designed to fill in certain fields of the error reporting structure. A macro is a single instruction that expands into a plurality of instructions upon compilation and execution. For example, the function may call the macro using two parameters: the pointer to the error reporting structure 100 and the error code number 110. The macro then uses the error code number 110 to determine and populate the error code 120 and the error description 130. In certain embodiments, a function or macro may be defined which is called using the error code number 110 and returns the error code 120 and/or the error description 130. Further, the macro may populate the other fields in the error reporting structure 100. For example, the macro may have access to the function name 160, the file name 140, and the line number 150. When called, the macro then simply copies this information to the designated fields within the error reporting structure. In this embodiment, the function is responsible for supplying the appropriate error code number 110 to the macro. The macro may be capable of populating all of the other fields. A sample macro that performs this function is shown in FIG. 3A.

The use of a macro that can populate these other fields aids in development, since the developer need not write software for populating the error reporting structure. This streamlines the development process by not adding complexity associated with error reporting. Further, the macro can be configured at compile time so only save as much information as is needed to minimize memory usage. For example, during early testing, the macro may save more information than is saved at later stages of development. FIG. 3B shows a second macro that may be used to save only the error code number 110, the function name 160, the file name 140, and the line number 150. The selection of which macro is to be used is decided at compile time by the definition of a compiler flag.

While FIGS. 3A and 3B show two different macros, where one of the macros is selected at compile time through the use of a compiler flag, other embodiments are also possible. For example, the macro may be constructed so as to include compiler flags therein, such that specific instructions within the macro are either included or excluded in the macro depending on the setting of the compiler flag. For example, referring to FIG. 3A, a compiler flag may be included after the first instruction, which determines whether the two instructions which populate the error code 120 and error description 130 are included when the code is compiled.

In the case of nested functions, where one function or routine calls another function, the calling function may pass its pointer to the called function. Alternatively, it may pass a different pointer to the called function.

For example, after the error reporting structure 100 is declared by the main program, a pointer to that error reporting structure 100 may be passed as a parameter to any function contained within that main program. For example, a function may be passed a list of parameters that are specific to the operation of that function, as well as the pointer to the error reporting structure 100. If that function calls another function, it may also pass the pointer to the error reporting structure 100 to that nested function.

By employing this enhanced error reporting mechanism, the software developer can, at a later time, review the error reporting structure and quickly identify exactly where the error condition occurred. This allows the developer to quickly focus on the actual source of the error, instead of having to step through the code to determine which of a number of different points in the software may have caused the error. This allows the software developer to expend effort on fixing the error, rather than identifying the source of the error.

This technique may be especially beneficial for real time operating systems where there are multiple threads. In such an embodiment, each application may declare one or more error reporting structures 100. Thus, the errors reported by one application are independent of errors reported by other functions.

While the above disclosure describes the use of multiple pointers of error reporting structures that are passed as parameters, other embodiments are also possible.

For example, rather than utilizing a pointer as a parameter that references an error reporting structure, the software may be constructed to only have one error reporting structure. In this embodiment, the location of the error reporting structure may be fixed and defined at compile time. Thus, rather than passing a parameter to each function that references an error reporting structure, all of the functions in all of the threads are aware of the global address of the error reporting structure. In this embodiment, whenever an error occurs, the function saves the error code in the error reporting structure that resides at the predefined global address. Further, as was described previously, a macro may be used to fill in the rest of the error reporting structure.

This embodiment minimizes memory usage, as there is only one error reporting structure that is stored in memory. Furthermore, the pointer does not need to be passed from the calling function to the called functions, thus reducing the amount of information that must be placed on the stack. However, it also has some drawbacks. For example, if multiple errors occurred during the execution of the software or if errors occur in two different threads, only the last error is captured in the global error reporting structure. This is because any previously written error reporting structures would have been overwritten by a subsequent error.

In yet another embodiment, the functions may not have access to the addresses of the error reporting structures. In this embodiment, a special error reporting function may be called whenever an error occurs. For example, the function that detects this error may call the macro described above and pass the error code and all of the pertinent information to the error reporting function. The error reporting function would then store all of this information in the next available error reporting structure and return back to the function.

Thus, the present disclosure describes an error reporting mechanism that allows more information to be captured and saved whenever an error occurs. In each embodiment, the software, when executed, upon detecting an error condition, populates fields in an error reporting structure. The fields in this error reporting structure may include error code, text description of the error, the file name, the function name, the line number of the error and other pertinent information. Of course, more or different information can be stored in the error reporting structure. The location of the error reporting structure may be determined in a number of different ways. In one embodiment, a fixed global address is used for the error reporting structure. In another embodiment, a pointer to an error reporting structure is passed as a parameter to the function. In yet another embodiment, the addresses of the error reporting structures are known only by an error reporting function.

Advantageously, the error reporting mechanism described herein allows the size and content of the error reporting structure to be defined at compile time. In other words, in certain embodiments, the definition of the error reporting structure is defined by the setting of one or more compiler flags. These same compiler flags are then used to dictate the behavior of the macro so that the operation of the macro is consistent with the structure of the error reporting structure.

An example of this consistency is described below. In this example, there may be a compiler flag referred to as ERROR_STRINGS_ENABLED. When this compiler flag is set, the error reporting structure is defined as shown in FIG. 2A. Similarly, the macro is defined as shown in FIG. 3A. Thus, in this mode, the error reporting structure 100 includes the error code 120 and the error description 130. Likewise, the macro populates these fields. When this compiler flag is not set, the error reporting structure is defined as shown in FIG. 2B. Similarly, the macro is defined as shown in FIG. 3B. Thus, in this mode, the error reporting structure 200 does not include the error code 120 and the error description 130. Consequently, the macro does not attempt to populate these non-existent fields. Thus, the use of compiler flags allows the creation of variable sized error reporting structures and corresponding macros to populate these error reporting structures.

Thus, in one embodiment, the disclosure describes a non-transitory storage medium which contains the code to define the error reporting structure and the macro to populate that error reporting structure. This non-transitory storage medium may also include compiler flags which determine what fields will be in the error reporting structure. These compiler flags may also determine how the macro populates these error reporting structures. Thus, the code contained on this non-transitory storage medium may not be compiled.

After this code is compiled, it will contain the selected error reporting structure format and the corresponding macro to populate that error reporting structure.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method of reporting errors in a software application, comprising:
    using the software application to define an area in memory to contain an error reporting structure;
    detecting an error has occurred;
    assigning an error code number to the error;
    determining a name of a file that was executing when the error occurred; and
    using a macro to write the error code number and the name of the file to the error reporting structure in the memory using the software application, wherein an address of the error reporting structure in the memory is made available to all functions in the software application; and
    wherein a size of the area in memory and fields contained within the error reporting structure are defined based on a compiler flag and the compiler flag is also used to define operation of the macro.

2. The method of claim 1, further comprising determining a line number where the error occurred and writing the line number in the error reporting structure.

3. The method of claim 1, further comprising determining a name of a function which was executing when the error occurred and writing the name of the function in the error reporting structure.

4. The method of claim 1, further comprising writing a text description of the error in the error reporting structure, where the text description of the error is generated based on the error code number.

5. The method of claim 1, wherein the address of the error reporting structure is defined as a global address.

6. A method of reporting errors in a software application, comprising:
    using a main program to define an area in memory to contain an error reporting structure;
    passing an address of the error reporting structure in the memory as a parameter to a function contained within the main program;
    detecting an error has occurred in the function; and
    using a macro to populate the error reporting structure in the area in memory, using the address that was passed to the function, wherein the error reporting structure is populated by the function;
    wherein a size of the area in memory and fields contained within the error reporting structure are defined based on a compiler flag and the compiler flag is also used to define the operation of the macro.

7. The method of claim 6, wherein the main program called a first function and passed the address of the error reporting structure to the first function and the first function called the function and passed the address to the function.

8. The method of claim 6, wherein a size of the error reporting structure is determined based on the compiler flag.

9. The method of claim 6, wherein the error reporting structure comprises an error code number, a name of a file where the error occurred and a line number where the error occurred.

10. The method of claim 9, wherein the error reporting structure comprises a name of the function where the error occurred.

11. The method of claim 9, wherein the error reporting structure comprises a text description of the error.

12. A non-transitory storage medium comprising:
    a software application, comprising:
        a main program to define an area in memory to contain an error reporting structure;
        a function contained within the main program to execute an operation;
        a compiler flag; and
        a macro designed to populate the error reporting structure;
        wherein the main program passes an address of the error reporting structure in the memory as a parameter to the function;
        the function uses the macro to populate the error reporting structure in the area in memory upon detection of an error, using the address that was passed to the function;
        wherein a value of the compiler flag determines fields of the error reporting structure and determines the operation of the macro.

13. The non-transitory storage medium of claim 12, wherein a size of the error reporting structure is determined based on the compiler flag.

* * * * *